(12) United States Patent
Horng et al.

(10) Patent No.: US 7,221,069 B2
(45) Date of Patent: May 22, 2007

(54) BALANCING STRUCTURE FOR MOTOR ROTOR

(75) Inventors: Alex Horng, Kaohsiung (TW); Chung-Jen Huang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 91 days.

(21) Appl. No.: 11/146,051

(22) Filed: Jun. 7, 2005

(65) Prior Publication Data

US 2006/0273667 A1   Dec. 7, 2006

(51) Int. Cl.
  *H02K 1/00* (2006.01)
  *H02K 5/24* (2006.01)
  *H02K 7/00* (2006.01)
(52) U.S. Cl. .................. 310/67 R; 310/51; 310/216
(58) Field of Classification Search ............. 310/67 R, 310/68 B, 51, 190–191, 216, 254, 193
  See application file for complete search history.

(56) References Cited

U.S. PATENT DOCUMENTS

| 4,547,714 | A | * | 10/1985 | Muller ........................ 318/254 |
| 4,899,075 | A | * | 2/1990 | Hasebe ....................... 310/257 |
| 5,962,938 | A | * | 10/1999 | Bobay et al. ............. 310/67 R |
| 6,050,785 | A | * | 4/2000 | Horng ........................ 417/354 |
| 6,097,120 | A |   | 8/2000 | Horng |
| 6,483,209 | B1 |   | 11/2002 | Horng et al. |
| 6,700,241 | B1 |   | 3/2004 | Horng et al. |
| 6,727,626 | B2 | * | 4/2004 | Horng et al. ............... 310/190 |
| 6,756,718 | B2 | * | 6/2004 | Lee ............................. 310/254 |
| 2005/0006962 | A1 |  | 1/2005 | Horng |

FOREIGN PATENT DOCUMENTS

| JP | 2-214455 A | * | 8/1990 | ................. 310/269 |
| TW | 383818 |  | 3/2000 | |
| TW | 422365 |  | 2/2001 | |
| TW | 428838 |  | 4/2001 | |
| TW | 590330 |  | 6/2004 | |
| TW | M241969 |  | 8/2004 | |

\* cited by examiner

*Primary Examiner*—Tran Nguyen
(74) *Attorney, Agent, or Firm*—Bacon & Thomas, PLLC (57) ABSTRACT

A motor includes a fixed portion having a stator with at least two pole faces. Each pole face includes a strong magnetic section and a weak magnetic section for respectively creating stronger and weaker alternating magnetic fields. A rotor includes a shaft rotatably extending through the fixed portion and an annular magnet mounted to an inner periphery of the rotor and facing the pole faces of the stator. At least one magnetically conductive balancing portion is mounted on the fixed portion and includes at least two magnetically conductive faces that are respectively aligned with the weak magnetic sections and that face at least one face of the annular magnet. When the rotor turns, the annular magnet of the rotor induces the stronger alternating magnetic fields and the weaker alternating magnetic fields and attracts the magnetically conductive faces to thereby maintain starting stability and rotational balance of the rotor.

17 Claims, 7 Drawing Sheets

BALANCING STRUCTURE FOR MOTOR ROTOR

BACKGROUND OF THE INVENTION

1. Field of the Invention

The present invention relates to a balancing structure. In particular, the present invention relates to a balancing structure for a rotor of a motor.

2. Description of Related Art

A wide variety of structures for maintaining rotational balance for a rotor of a motor have been proposed. One of these structures comprises a fixed portion, a rotor, an attracting portion, and a magnetically conductive portion. The fixed portion includes a base, an axial tube fixed on the base, a bearing received in the axial tube, a stator, and a circuit board. The stator includes a coil with axial winding or radial winding and a plurality of pole plates (or pole arms). The rotor includes a shaft rotatably extending through the bearing and an annular magnet surrounding the pole faces of the pole plates. The attracting portion is provided on a bottom of the rotor or a top end of the axial tube. Alternatively, the attracting portion is provided by the annular magnet or the alternating magnetic fields created by the pole plates of the stator. The magnetically conductive portion is made of a magnetically conductive material and may be comprised of a disc with two arcuate edges, a casing fixed in a rotor housing of the rotor, an annular plate, a plurality of arcuate plates, or a rotor housing of a spindle motor. The magnetically conductive portion may be provided on the circuit board, an inner periphery of the rotor, or the bottom of the rotor, and associated with the attracting portion. Such a structure is disclosed in, e.g., Taiwan Utility Model Publication Nos. 383818, 422365, 428838, 590330, and M241969, U.S. Pat. Nos. 6,097,120; 6,483,209; 6,700,241; and 6,727,626, and U.S. Patent Publication No. 2005/0006962.

When the motor turns, alternating magnetic fields are created by the pole faces of the magnetic pole plates (or pole arms). The magnetically conductive portion is attracted by the attracting portion during rotation of the rotor, thereby maintaining rotational balance of the rotor, avoiding disengagement of the rotor shaft from the stator, reducing rotational friction of the bearing, and prolonging the life of the motor.

In the motors disclosed in U.S. Pat. Nos. 6,483,209 and 6,727,626, each pole face of the magnetic pole plates includes a strong magnetic section and a weak magnetic section. At the moment of starting the motor by energizing the winding, the strong magnetic section on each pole face creates stronger alternating magnetic fields whereas the weak magnetic section on each pole face creates weaker alternating magnetic fields, resulting in uneven alternating magnetic fields for driving the rotor to turn.

However, problems still exist in the above-mentioned rotational balancing structures for easy-to-start motors. For example, the metal plate consisting of the magnetically conductive portion is made as large as possible so as to provide a large area facing the annular magnet of the rotor. This may result in excessive attracting force between the magnetically conductive portion and the attracting portion for balancing the rotor. Further, the magnetically conductive portion often extends across the alternating magnetic fields created by the pole faces of the stator, particularly across the stronger magnetic sections, which adversely affects the alternating magnetic fields and lowers the rotational efficiency of the rotor. Further, although provision of the strong magnetic section and the weak magnetic section on each pole face is advantageous to easy starting, the local uneven energizing resulting from the strong magnetic sections and the weak magnetic sections results in vibration and shaking at the moment of starting the rotor. The rotational wear to the bearing could not be reduced and the life of the motor could not be prolonged. Further, the actual effect of the rotational balancing structure was not satisfactory as expected.

OBJECTS OF THE INVENTION

An object of the present invention is to provide a balancing structure for assuring rotational efficiency for a rotor of a motor.

Another object of the present invention is to provide a balancing structure for maintaining stable rotation of a rotor of a motor.

A further object of the present invention is to provide a balancing structure for obtaining stable starting of a rotor of a motor.

Still another object of the present invention is to provide a balancing structure for obtaining starting balance for a rotor of a motor.

SUMMARY OF THE INVENTION

A motor in accordance with the present invention comprises a fixed portion, a rotor, and at least one magnetically conductive balancing plate. The fixed portion includes a stator having at least one winding and at least one pole plate that extends to form at least two pole faces, with a gap being defined between a pair of the at least two pole faces adjacent to each other. Each pole face includes a strong magnetic section and a weak magnetic section. The at least one winding is energizable to make the strong magnetic sections and the weak magnetic sections create stronger alternating magnetic fields and weaker alternating magnetic fields respectively.

The rotor includes a shaft and an annular magnet. The shaft rotatably extends through the fixed portion, and the annular magnet is mounted to an inner periphery of the rotor and facing the at least two pole faces of the stator.

The at least one magnetically conductive balancing portion is mounted on the fixed portion and includes at least two magnetically conductive faces that are respectively aligned with the weak magnetic sections of the at least two magnetic pole faces of the stator and that face at least one face of the annular magnet.

When the rotor turns, the annular magnet of the rotor induces the stronger alternating magnetic fields and the weaker alternating magnetic fields respectively created by the strong magnetic sections and the weak magnetic sections of the stator and attracts the magnetically conductive faces facing the weak magnetic sections to thereby maintain starting stability and rotational balance of the rotor.

Preferably, each magnetically conductive face is not aligned with the strong magnetic sections of the at least two pole faces. In a case that each magnetically conductive face has a span greater than a length of each weak magnetic section, each magnetically conductive face extends into one of the gaps adjacent to an associated one of the weak magnetic sections. Preferably, each magnetically conductive face extends across at least a portion of the gap.

In an embodiment, the fixed portion includes an axial tube, and the at least one magnetically conductive balancing portion is a disc with a central hole and mounted around the axial tube. The at least two magnetically conductive faces extend from a circumference of the disc and face an inner periphery of the annular magnet.

Preferably, the fixed portion further includes a circuit board, and the at least one magnetically conductive balancing portion is in intimate contact with an underside or a top side of the circuit board.

Preferably, each strong magnetic section has a radial thickness greater than that of each weak magnetic section.

Preferably, a distance between each strong magnetic section and the annular magnet is smaller than that between each weak magnetic section and the annular magnet.

Preferably, each weak magnetic section comprises a through-hole.

In another embodiment, the at least one magnetically conductive balancing portion comprises at least two notches respectively aligned with the at least two pole faces of the stator, and the at least one magnetically conductive balancing portion includes at least two extensions respectively aligned with the weak magnetic sections of the stator.

Preferably, the at least two magnetically conductive faces are respectively located on upper faces of distal ends of the at least two extensions, and the at least two magnetically conductive faces face a bottom face of the annular magnet of the rotor.

In a further embodiment, the at least one magnetically conductive balancing portion includes a plurality of metal plates, with each magnetically conductive face being formed on an upper face of each metal plate.

Preferably, the metal plates are fixedly mounted on a circuit board or a base of the circuit board. Further, the metal plates are respectively aligned with the weak magnetic portions of the stator and face a bottom face of the annular magnet of the rotor.

Preferably, the stator includes radial winding or axial winding.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
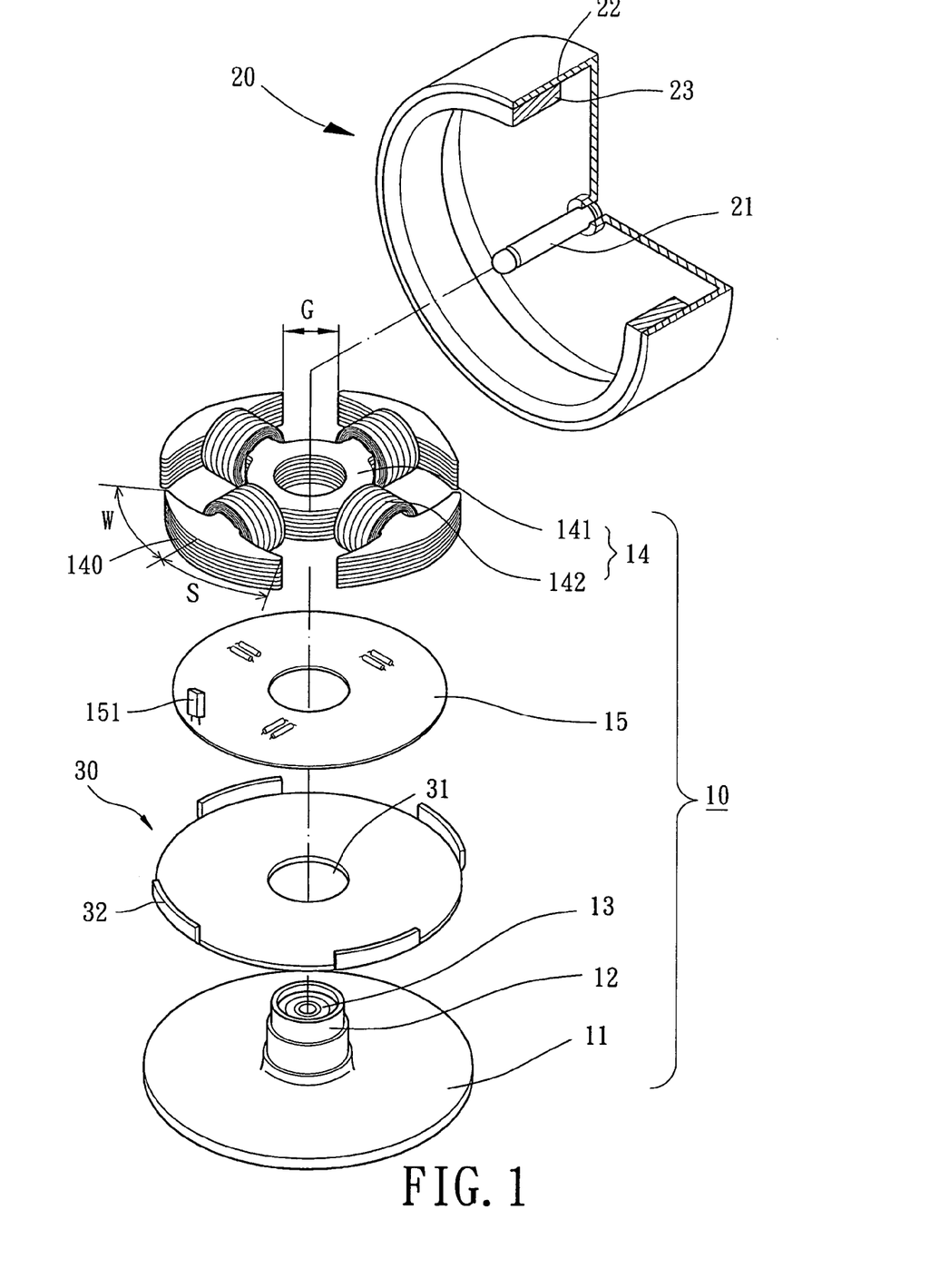
FIG. 1 is an exploded perspective view of a first embodiment of a motor in accordance with the present invention.

Referring to FIG. 1, a first embodiment of a motor in accordance with the present invention comprises a fixed portion 10, a rotor 20, and a magnetically conductive balancing portion 30. The motor can be used as a motor for a heat-dissipating fan, a spindle motor for an optical disk drive, etc. In particular, the motor can be used as a motor for a heat-dissipating fan or a spindle motor for an optical disk drive of the type having an easy-to-start structure.

Figure 2:
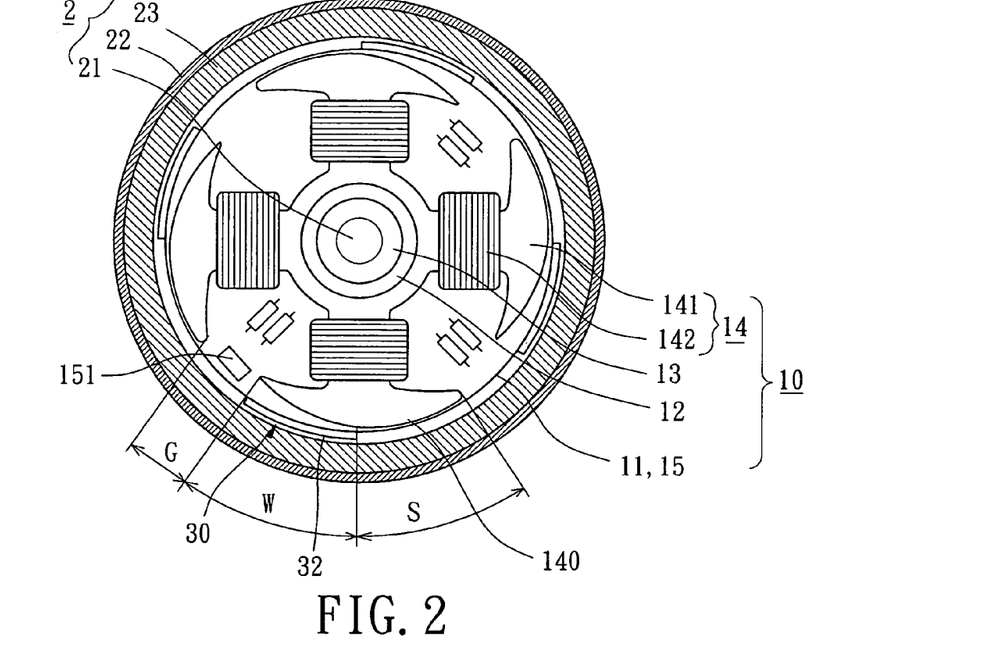
FIG. 2 is a sectional view of the motor in FIG. 1.

Referring to FIGS. 1 and 2, the fixed portion 10 includes a base 11, an axial tube 12, a bearing 13, a stator 14, and a circuit board 15. The base 11 may be coupled to a casing of the motor. The axial tube 12 is fixed on or integrally formed with the base 11. At least one bearing 13 is mounted in the axial tube 12 whereas as the stator 14 and the circuit board 15 are mounted around the axial tube 12. The bearing 13 may be an oily bearing, ball bearing, fluid dynamic bearing, or magnetic bearing.

The stator 14 may be a stator with radial winding. The stator 14 includes at least one pole plate 141 and at least two windings 142. In the illustrated embodiment, the pole plates 141 are stacked along an axial direction, with windings 142 wound therearound along a radial direction. Each pole plate 141 extends radially to form a plurality of pole faces 140, with a gap G being defined between mutually facing ends respectively of a pair of pole plates 141 adjacent to each other.

Each pole face 140 includes a strong magnetic section S and a weak magnetic section W. The strong magnetic section S has a radial thickness greater than that of the weak magnetic section W. Further, the distance between the strong magnetic section S and the annular magnet 23 is smaller than that between the weak magnetic section W and the annular magnet 23.

At least one sensor 151 is mounted on the circuit board 15 for detecting rotational status of the rotor 20. When a control circuit of the circuit board 15 is on, the directions of the electric current of the windings 142 are alternately controlled by the control circuit of the circuit board 15 such that stronger alternating magnetic fields and weaker alternating magnetic fields are respectively created by the strong magnetic sections S and the weak magnetic sections W.

Still referring to FIGS. 1 and 2, the rotor 20 includes a shaft 21, a housing 22, and an annular magnet 23. An end of the shaft 21 is fixed to a center of an end wall of the housing 22, with the other end of the shaft 21 rotatably extending through the bearing 13. The annular magnet 23 is mounted to an inner periphery of the housing 22. The annular magnet 23 includes a plurality of alternately disposed north pole sections (not shown) and south pole sections (not shown) on an inner periphery thereof, with the annular magnet 23 radially facing the pole faces 140 of the stator 14. Thus, uneven alternate energizing provided by the strong magnetic sections S and the weak magnetic sections W drives the rotor 20 to turn.

Still referring to FIGS. 1 and 2, the magnetically conductive balancing portion 30 is substantially a disc made of a magnetically conductive material such as iron. The magnetically conductive balancing portion 30 includes a central hole 31 and at least two magnetically conductive faces 32 (four in this embodiment) extending upward (or downward) from a circumference of the magnetically conductive portion 30. The magnetically conductive balancing portion 30 is mounted around the axial tube 12 through provision of the central hole 31. The magnetically conductive balancing portion 30 is in intimate contact with an underside or a top side of the circuit board 15.

Figure 2A:
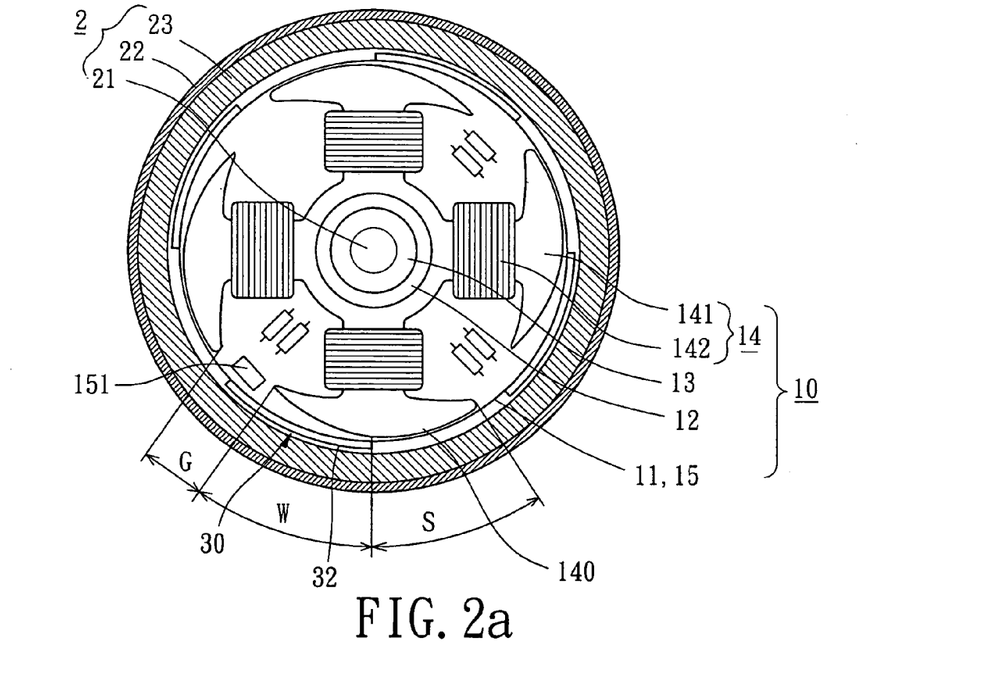
FIG. 2a is a sectional view showing another example of a magnetically conductive face.
Figure 2B:
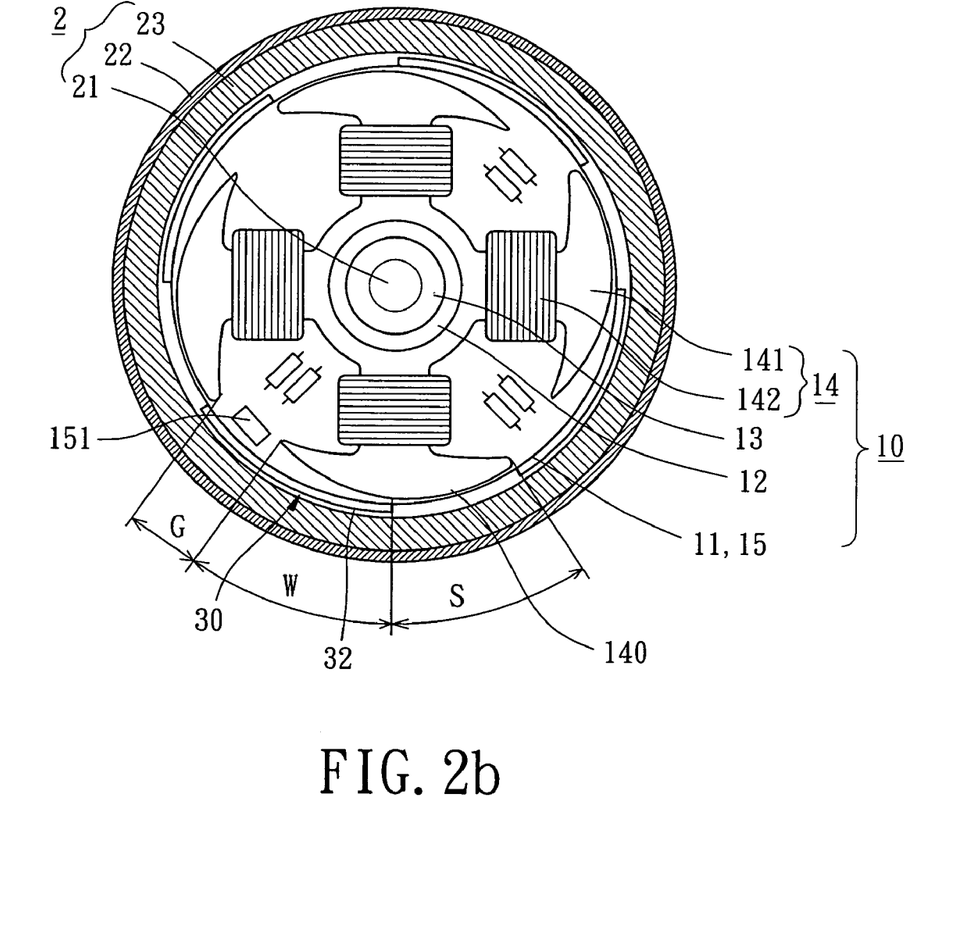
FIG. 2b is a sectional view showing a further example of the magnetically conductive face.

In assembly, the magnetically conductive faces 32 are preferably respectively aligned with the weak magnetic sections W of the pole faces 140 of the stator 14 and face the inner periphery of the annular magnet 23. Each magnetically conductive face 32 has a span smaller than a length of the associated weak magnetic section W. Nevertheless, the span of each magnetically conductive face 32 can be equal to the length of the associated weak magnetic section W (FIG. 2a) or greater than the length of the associated weak magnetic section W (FIG. 2b).

It is noted that each magnetically conductive face 32 does not face (i.e., not overlaps with) the strong magnetic section S of the associated pole face 140. In a case that the span of each magnetically conductive face 32 is greater than the length of the associated weak magnetic section W, the magnetically conductive face 32 extends into the gap G adjacent to the associated weak magnetic section W. The magnetically conductive face 32 may extend across a portion of or the whole length of the associated gap G.

Still referring to FIGS. 1 and 2, after assembly, the magnetically conductive faces 32 of the magnetically conductive balancing portion 30 are fixed on the fixed portion and respectively aligned with the weak magnetic sections W of the pole faces 140 of the stator 14 and face the inner periphery of the annular magnet 23 of the rotor 20. At the moment of starting the motor, the strong magnetic sections S and the weak magnetic sections W of the pole faces 140 create uneven alternative magnetic fields that are advantageous to driving the rotor 20 to turn. At this time, although the magnetically conductive faces 32 do not create alternating energizing, the magnetically conductive faces 32 and the inner periphery of the annular magnet 23 can provide a magnetically balancing force in the weak magnetic zones W. This magnetically balancing force reduces the alternating energizing difference between the weak magnetic sections W and the strong magnetic sections S, avoiding temporary imbalanced vibration or shaking at the moment of starting the motor. The starting balance and starting stability of the rotor 20 are thus improved.

On the other hand, during operation of the motor, the stronger alternating magnetic fields created by the strong magnetic sections S of the pole faces 140 are essential for driving the rotor 20 to turn, while the weaker alternating magnetic fields created by the weak magnetic sections W merely provide assistance. More specifically, by aligning the respective magnetically conductive faces 32 with the respective weak magnetic sections W (and the gaps G), the magnetically conductive faces 32 provide an appropriate magnetically attracting balancing effect to maintain the rotational balance and rotational stability of the rotor 20 without adversely affecting the alternating energizing efficiency of the strong magnetic sections S of the stator 14.

Figure 3:
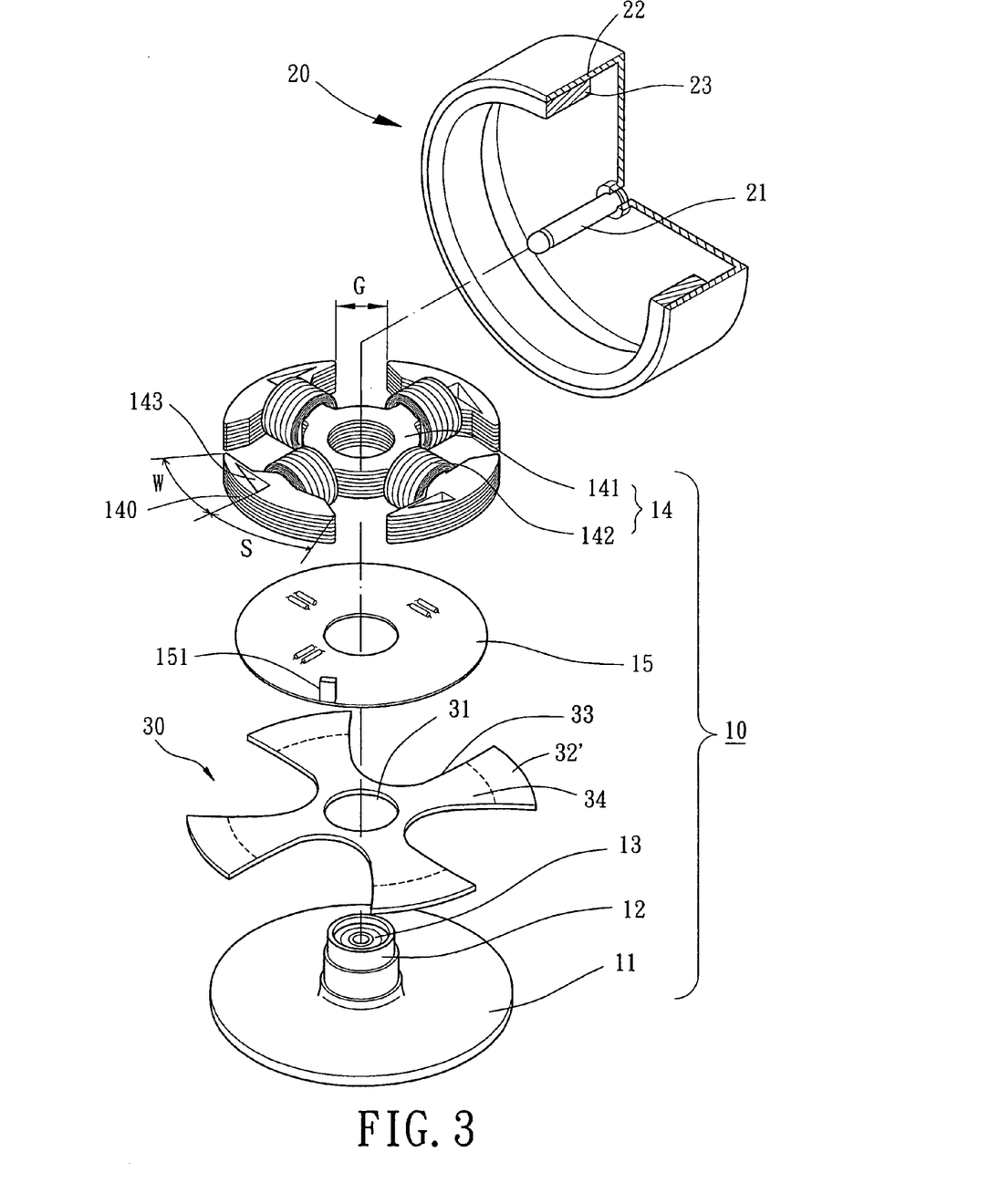
FIG. 3 is an exploded perspective view of a second embodiment of the motor in accordance with the present invention.
Figure 4:
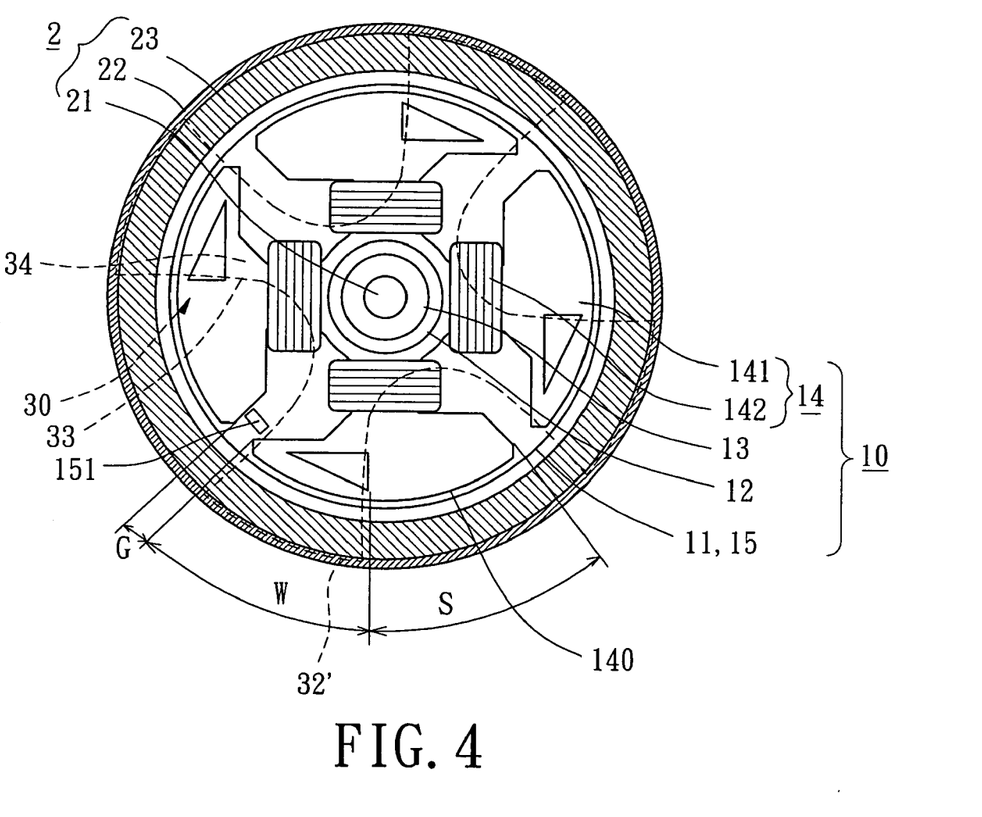
FIG. 4 is a sectional view of the motor in FIG. 3.

FIGS. 3 and 4 illustrate a second embodiment of the invention, wherein the magnetically conductive balancing portion 30 includes a plurality of notches 33 respectively aligned with the strong magnetic sections S of the pole faces 140 of the stator 14. Further, the magnetically conductive balancing portion 30 includes a plurality of extensions 34 respectively aligned with the weak magnetic sections W of the pole faces 140 of the stator 14. Each extension 34 has a magnetically conductive face 32' on an upper face of a distal end thereof.

Each strong magnetic section S has a radial thickness greater than that of each weak magnetic section W. The distance between each strong magnetic section S and the annular magnet 23 is equal to that between each weak magnetic section W. Further, each weak magnetic section S includes a through-hole 143 in the axial direction of the stator 14. The magnetically conductive balancing portion 30 is in intimate contact with an underside or a top side of the circuit board 15.

Preferably, the respective magnetically conductive faces 32' face a bottom face of the annular magnet 23 after assembly. Further, each magnetically conductive face 32' has a span not smaller than a length of the associated weak magnetic section W. In a case that the span of each magnetically conductive face 32' is greater than the length of the associated weak magnetic section W, the magnetically conductive face 32 extends into the gap G adjacent to the associated weak magnetic section W. The magnetically conductive face 32 may extend across a portion of or the whole length of the associated gap G.

Similar to the above embodiment, the magnetically conductive faces 32' of the magnetically conductive balancing portion 30 and the annular magnet 23 of the rotor 20 provide an appropriate magnetically attracting balancing effect without adversely affecting the alternating energizing efficiency of the strong magnetic sections S of the stator 14. Temporary vibration or shaking during the moment of starting the motor is avoided. The starting balance, starting stability, rotational balance, and rotational stability of the rotor 20 are maintained.

Figure 5:
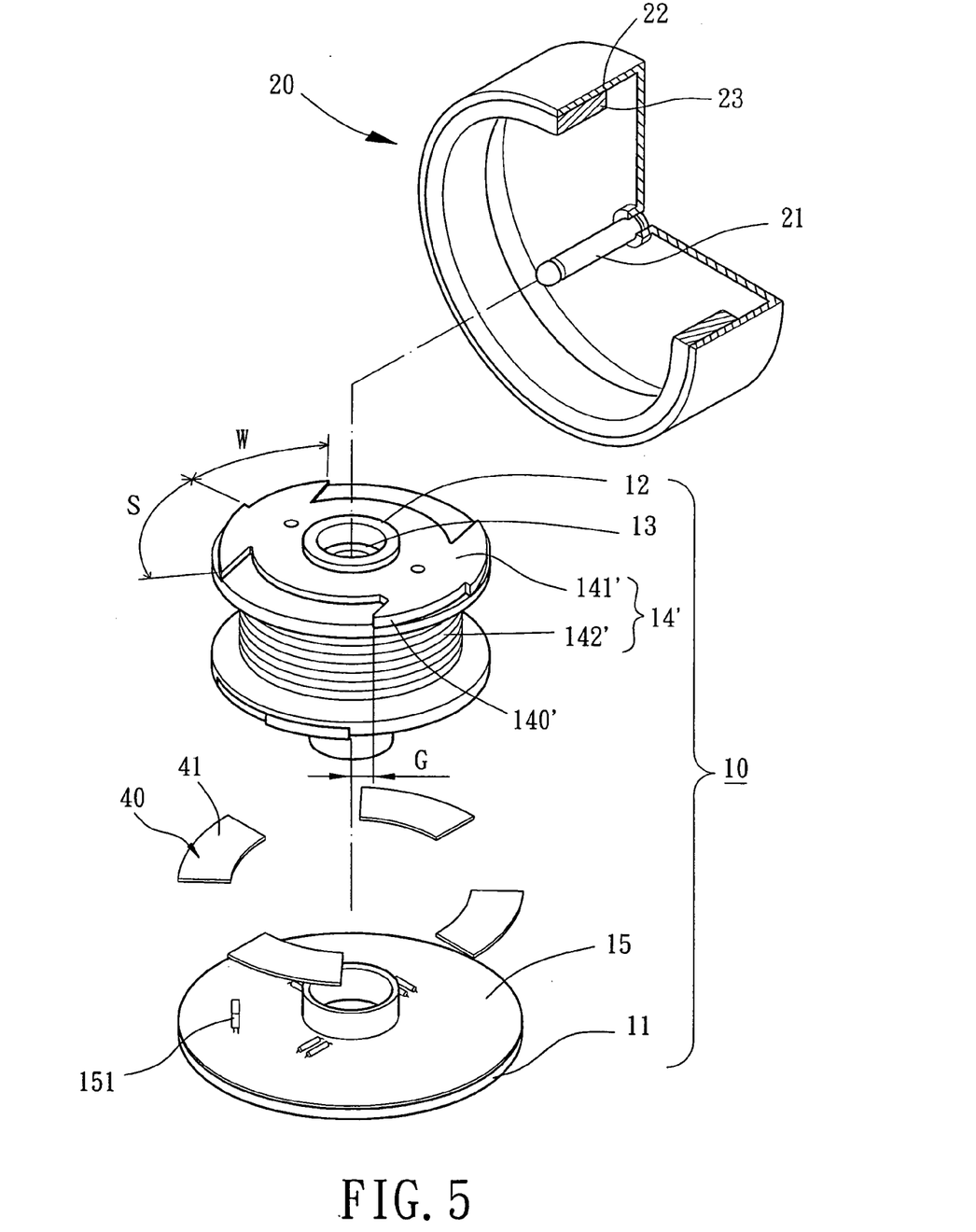
FIG. 5 is an exploded perspective view of a third embodiment of the motor in accordance with the present invention.
Figure 6:
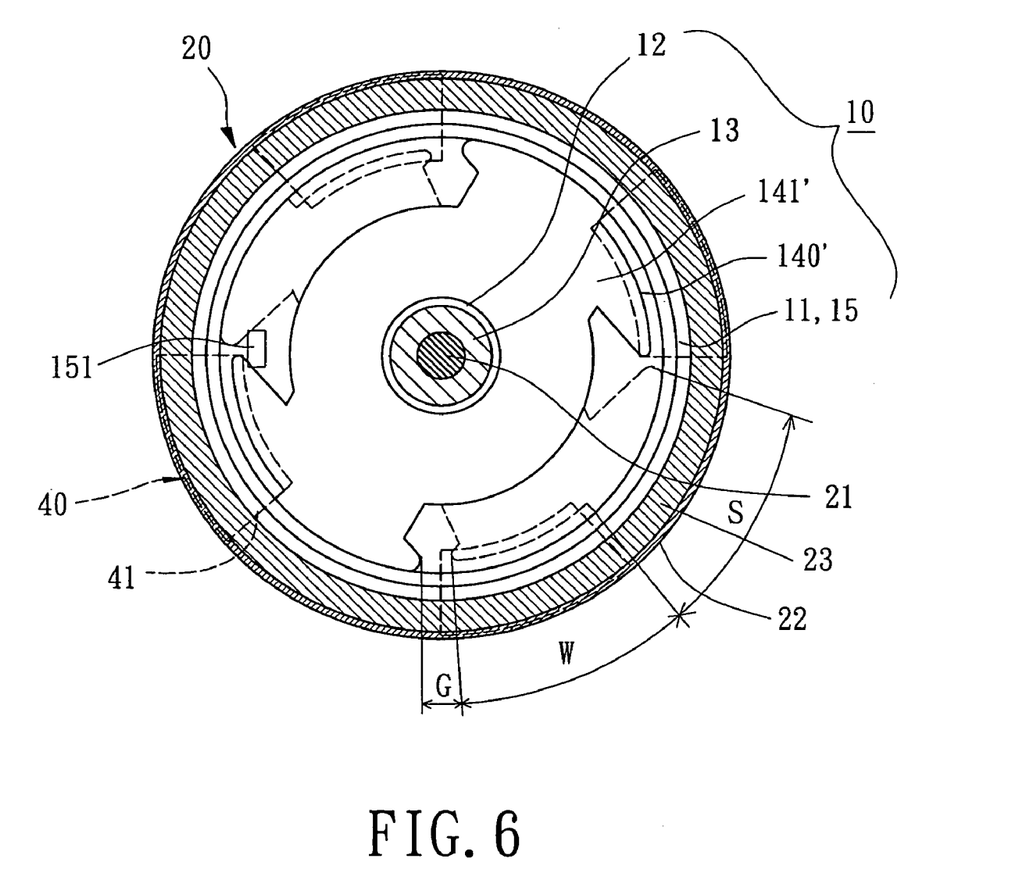
FIG. 6 is a sectional view of the motor in FIG. 5.

FIGS. 5 and 6 illustrate a third embodiment of the invention, wherein two magnetically conductive balancing portion 40 (four in this embodiment) are provided. Each magnetically conductive balancing portion 40 is a substantially arcuate metal plate having a magnetically conductive face 41 on an upper face thereof. The fixed portion 10 includes a stator 14' having at least two pole plates 141' and an axial winding 142' wound between the pole plates 141'. In particular, each pole plate 141' extends radially to form a plurality of pole faces 140' each having a strong magnetic section S and a weak magnetic section W, with a gap G defined between a pair of pole plates 140' adjacent to each other.

A radial gap between each strong magnetic section S and the annular magnet 23 of the rotor 20 is smaller than that between each weak magnetic section W and the annular magnet 23 of the rotor 20.

After assembly, the magnetically conductive balancing portions 40 are fixed on the base 11 or the circuit board 15 of the fixed portion 10. Further, the respective magnetically conductive balancing portions 40 are aligned with the respective weak magnetic sections W of the pole faces 140', with the magnetically conductive faces 41 facing a bottom face of the annular magnet 23.

Each magnetically conductive balancing portion 40 has a span not smaller than a length of the associated weak magnetic section W. In a case that the span of each magnetically conductive balancing portion 40 is greater than the length of the associated weak magnetic section W, the magnetically conductive face 41 extends into the gap G adjacent to the associated weak magnetic section W. The magnetically conductive face 41 may extend across a portion of or the whole length of the associated gap G.

Similar to the above embodiments, the magnetically conductive faces 41 of the magnetically conductive balancing portions 40 and the annular magnet 23 of the rotor 20 provide an appropriate magnetically attracting balancing effect without adversely affecting the alternating energizing efficiency of the strong magnetic sections S of the pole faces 140'. Temporary vibration or shaking during the moment of starting the motor is avoided. The starting balance, starting stability, rotational balance, and rotational stability of the rotor 20 are maintained.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A motor comprising:
    a fixed portion including a stator, the stator including at least one winding and at least one pole plate, said at least one pole plate extending to form at least two pole faces, each of said at least two pole faces including a strong magnetic section and a weak magnetic section, said at least one winding being energizable to make the strong magnetic sections and the weak magnetic sections create stronger alternating magnetic fields and weaker alternating magnetic fields respectively;
    a rotor including a shaft and an annular magnet, the shaft rotatably extending through the fixed portion, the annular magnet being mounted to an inner periphery of the rotor and facing said at least two pole faces of the stator; and
    at least one magnetically conductive balancing portion mounted on the fixed portion, said at least one magnetically conductive balancing portion including at least two magnetically conductive faces that are respectively aligned with the weak magnetic sections of said at least two magnetic pole faces of the stator and that face at least one face of the annular magnet;
    wherein when the rotor turns, the annular magnet of the rotor induces the stronger alternating magnetic fields and the weaker alternating magnetic fields respectively created by the strong magnetic sections and the weak magnetic sections of the stator and attracts the magnetically conductive faces facing the weak magnetic sections to thereby maintain starting stability and rotational balance of the rotor.

2. The motor as claimed in claim 1, wherein each said magnetically conductive face is not aligned with the strong magnetic sections of said at least two pole faces.

3. The motor as claimed in claim 2, wherein each said magnetically conductive face has a span greater than a length of each said weak magnetic section, and wherein each said magnetically conductive face extends into one of gaps adjacent to an associated one of the weak magnetic sections and defined between a pair of said at least two pole faces adjacent to each other.

4. The motor as claimed in claim 3, wherein each said magnetically conductive face extends across at least a portion of said one of the gaps.

5. The motor as claimed in claim 1, wherein the fixed portion includes an axial tube, and wherein said at least one magnetically conductive balancing portion is a disc with a central hole and mounted around the axial tube.

6. The motor as claimed in claim 5, wherein said at least two magnetically conductive faces extend from a circumference of the disc and face an inner periphery of the annular magnet.

7. The motor as claimed in claim 1, wherein the fixed portion further includes a circuit board with an underside, and wherein said at least one magnetically conductive balancing portion is in intimate contact with the underside of the circuit board.

8. The motor as claimed in claim 1, wherein the fixed portion further includes a circuit board with a top side, and wherein said at least one magnetically conductive balancing portion is in intimate contact with the top side of the circuit board.

9. The motor as claimed in claim 1, wherein each said strong magnetic section has a radial thickness greater than that of each said weak magnetic section.

10. The motor as claimed in claim 1, wherein a distance between each said strong magnetic section and the annular magnet is smaller than that between each said weak magnetic section and the annular magnet.

11. The motor as claimed in claim 1, wherein each said weak magnetic section comprises a through-hole.

12. The motor as claimed in claim 5, wherein said at least one magnetically conductive balancing portion comprises at least two notches respectively aligned with said strong magnetic sections of said at least two pole faces of the stator, and wherein said at least one magnetically conductive balancing portion includes at least two extensions respectively aligned with the weak magnetic sections of said at least two pole faces of the stator.

13. The motor as claimed in claim 12, wherein said at least two magnetically conductive faces are respectively located on upper faces of distal ends of said at least two extensions, and wherein said at least two magnetically conductive faces face a bottom face of the annular magnet of the rotor.

14. The motor as claimed in claim 1, wherein said at least one magnetically conductive balancing portion includes a plurality of metal plates, with each said magnetically conductive face being formed on an upper face of each said metal plate.

15. The motor as claimed in claim 14, wherein the fixed portion includes a circuit board, the metal plates being fixedly mounted on the circuit board and respectively aligned with the weak magnetic portions of the stator and facing a bottom face of the annular magnet of the rotor.

16. The motor as claimed in claim 14, wherein the fixed portion includes a base, the metal plates being mounted on the base and respectively aligned with the weak magnetic portions of the stator and facing a bottom face of the annular magnet of the rotor.

17. The motor as claimed in claim 1, wherein the stator includes one of radial winding and axial winding.

* * * * *